United States Patent
Horoho et al.

(10) Patent No.: US 7,195,363 B2
(45) Date of Patent: Mar. 27, 2007

(54) ILLUMINATED KNOB

(75) Inventors: David R Horoho, Greentown, IN (US); Brad A Farris, Lebanon, IN (US); Matthew L Kemp, Indianapolis, IN (US)

(73) Assignee: Emerson Electric Co., St. Louis, MO (US)

( * ) Notice: Subject to any disclaimer, the term of this patent is extended or adjusted under 35 U.S.C. 154(b) by 91 days.

(21) Appl. No.: 11/050,279

(22) Filed: Feb. 3, 2005

(65) Prior Publication Data
US 2006/0171136 A1  Aug. 3, 2006

(51) Int. Cl.
*H04M 1/22* (2006.01)

(52) U.S. Cl. ........................................... 362/23

(58) Field of Classification Search .................. 362/23, 362/24, 100; 200/310, 313, 314, 317
See application file for complete search history.

(56) References Cited

U.S. PATENT DOCUMENTS

| | | | |
|---|---|---|---|
| 5,050,269 A | 9/1991 | Engstrom et al. | |
| 5,359,165 A | 10/1994 | Leveque et al. | |
| 5,450,653 A | 9/1995 | Howie, Jr. | |
| 5,752,759 A | 5/1998 | Pizzo | |
| 5,845,365 A | 12/1998 | Howie, Jr. | |
| 5,865,302 A | 2/1999 | Suzuki et al. | |
| 6,003,206 A | 12/1999 | Hall et al. | |
| 6,019,478 A | 2/2000 | Pizzo | |
| 6,310,308 B1 * | 10/2001 | Watson et al. | 200/520 |
| 6,767,104 B2 | 7/2004 | Worrell | |
| 6,948,824 B2 * | 9/2005 | Miwa | 362/26 |

\* cited by examiner

*Primary Examiner*—Sandra O'Shea
*Assistant Examiner*—Mark Tsidulko
(74) *Attorney, Agent, or Firm*—Harness, Dickey & Pierce, PLC

(57) ABSTRACT

An illuminated knob is provided. The knob includes a light source attached to a carrier assembly that is attached to the knob such that the light source is positioned within the interior of the knob. The carrier assembly provides an electrical connection between the light source and a base assembly such that when the knob is operated, the contact wipers maintain the electrical connection with the base assembly.

19 Claims, 3 Drawing Sheets

ILLUMINATED KNOB

FIELD OF THE INVENTION

The present invention relates to an illuminated knob, and more particularly to an illuminated knob having a light source in a carrier assembly that maintains an electrical connection for the light source when the illuminated knob is operated.

BACKGROUND OF THE INVENTION

Many devices require a knob with an illuminated indicator to communicate information relating to the function or operation of the knob or device with which it is associated. For example, illumination can be used to communicate the position of the knob or the state of the device. Knob illumination has traditionally been accomplished by the use of a stationary light source and light directing light pipes. A light pipe typically consists of a light transmitting plastic. The light pipe directs illumination from a light source to an illuminated destination by reflecting the light along the interior of the light pipe. The light source is placed in a stationary location, and the illumination from the light source is directed by internal reflection through the light pipe to the interior of the knob or, specifically, to an indicator window of the knob.

As the knob rotates, slides, or is otherwise operated, the position of the light pipe within the knob changes relative to the stationary light source thereby varying the reflection angles traversed within the light pipe. Consequently, the quality or intensity of the illumination provided by the light pipe may vary as the knob is operated.

Light source leads are typically not sturdy. Thus, an electrical connection to light source leads must be sufficiently stable such that the electrical connection is not disrupted by vibration or friction caused by the operation of the knob.

The design of devices utilizing illuminated knobs is often hampered by the unpredictable nature of the stationary light source and light pipe configuration. Device design may require revisions as the knob and light pipes are adjusted through trial and error, resulting in additional design time and cost.

SUMMARY OF THE INVENTION

In accordance with the present invention, an illuminated knob is provided. The knob includes a housing, a light source, a carrier assembly, and a base assembly. The light source is attached to the carrier assembly. The carrier assembly is attached to the housing and maintains an electrical connection between the light source and the base assembly throughout operation of the knob. The light source illuminates the knob.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
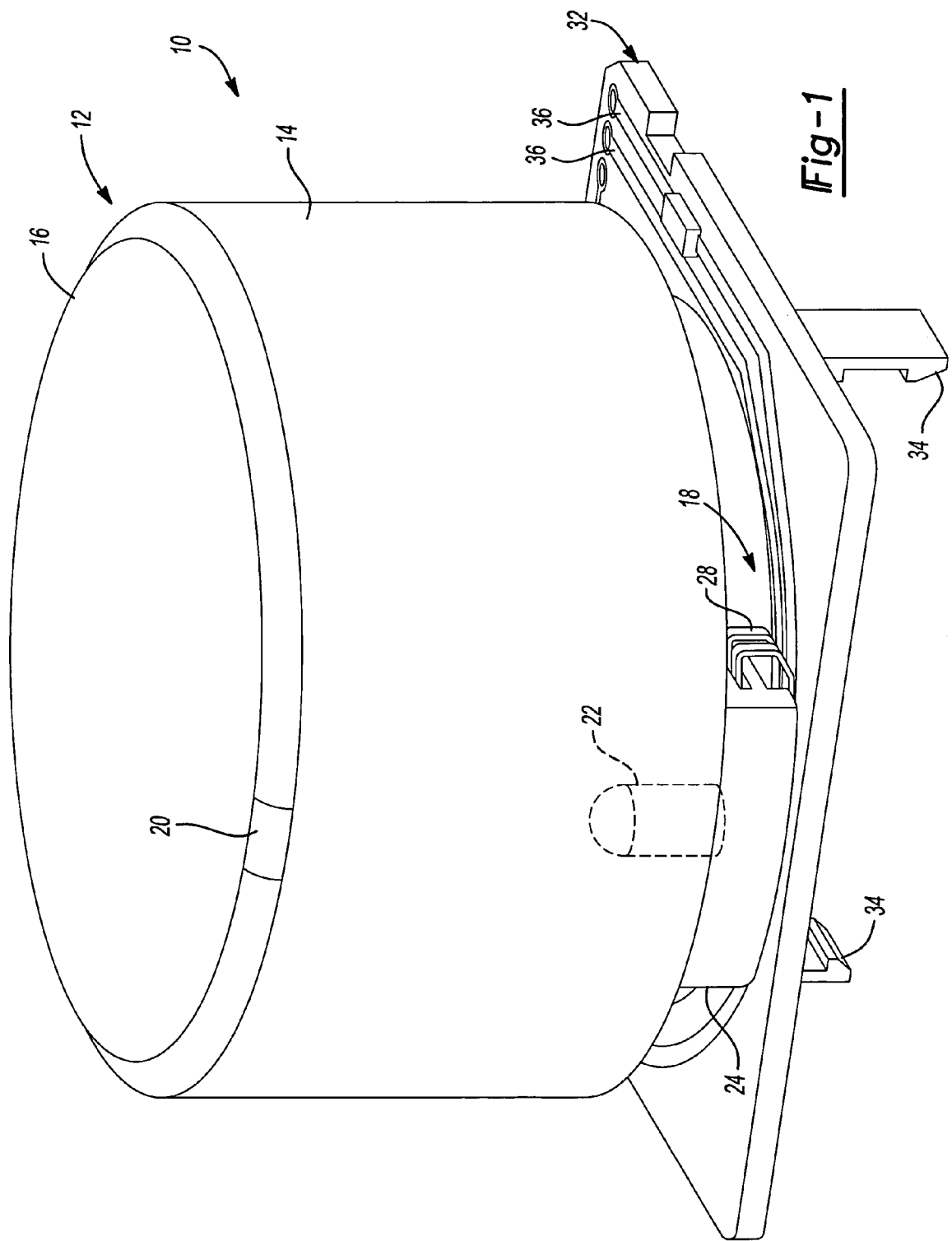
FIG. 1 is a perspective view of the illuminated knob of the invention.
Figure 2:
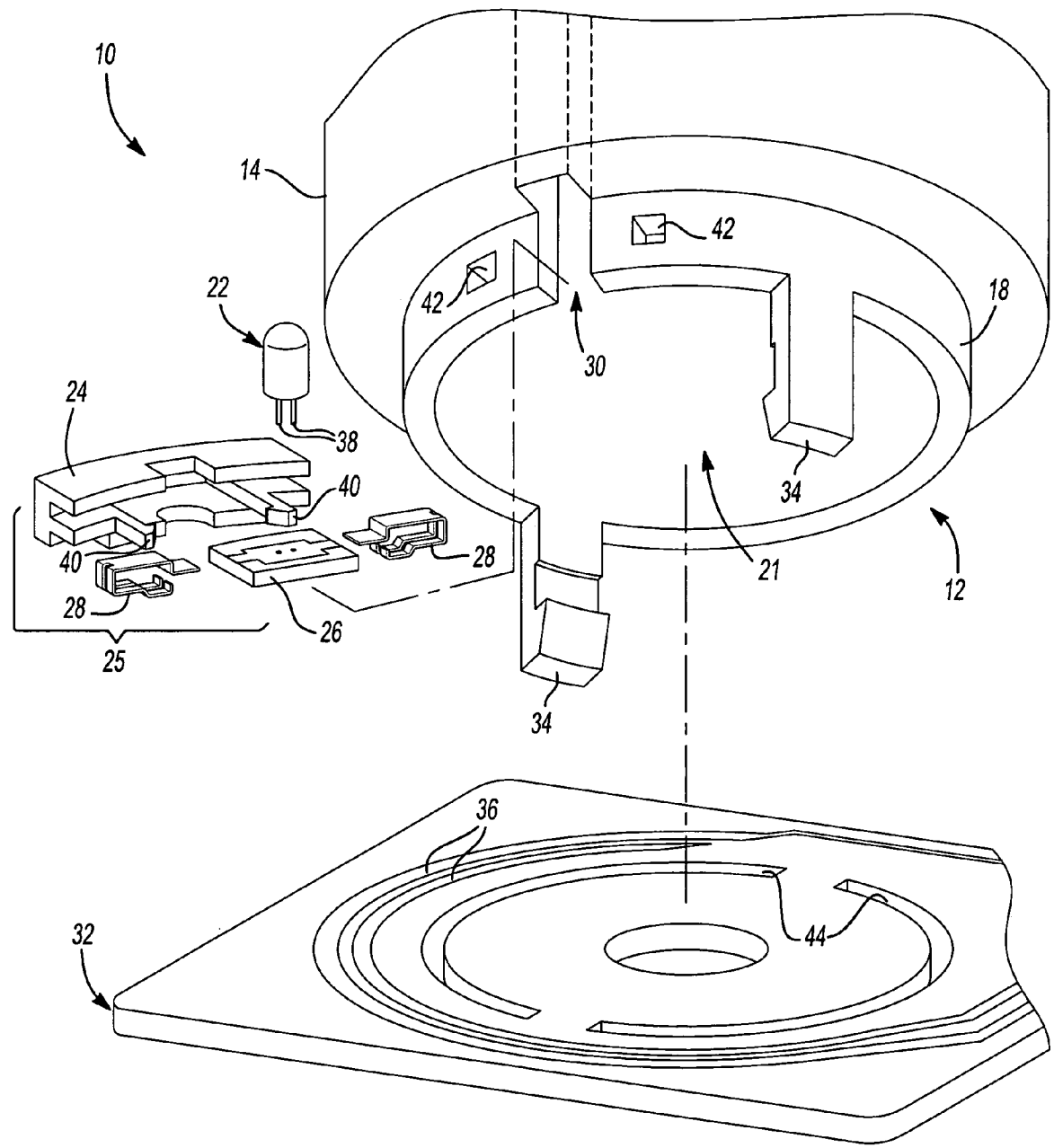
FIG. 2 is an exploded perspective view of the illuminated knob of FIG. 1.
Figure 3:
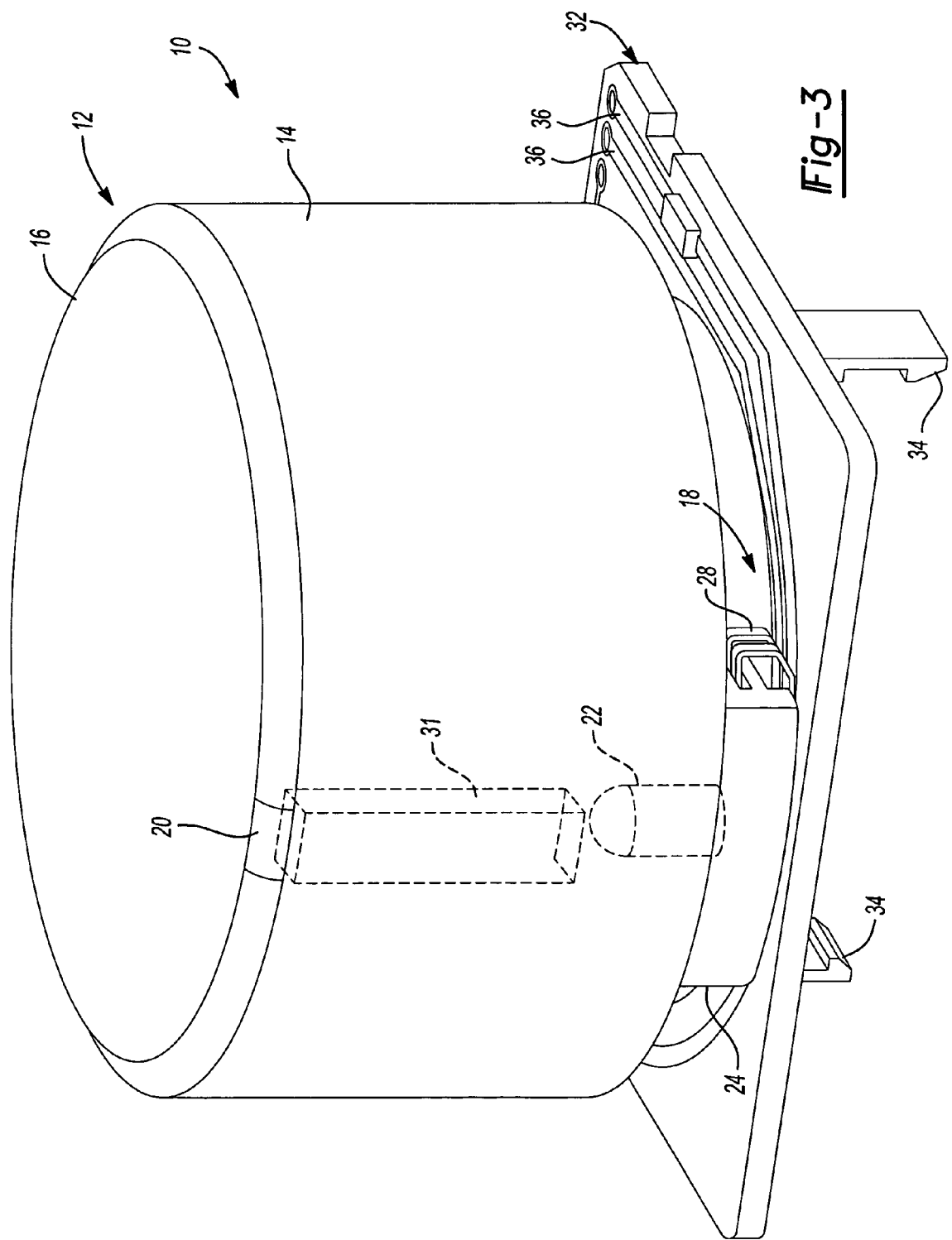
FIG. 3 is a perspective view of the illuminated knob of the invention further incorporating a light pipe for directing light from a light source to illuminate a window in the knob.

Referring to FIGS. 1, 2, and 3, an illuminated knob 10 in accordance with the invention is shown. The illuminated knob 10 includes a housing 12, a light source 22, a carrier assembly 25, and a base assembly 32. The light source 22 is received by the carrier assembly 25, which attaches to the housing 12 such that the light source 22 is positioned within the housing 12. The housing 12 operates on the base assembly 32. The position of the light source 22 within the housing 12 remains fixed while the housing 12 is operated on the base assembly 32. Further, an electrical connection between the light source 22 and a power source (not shown) through the carrier assembly 25 and base assembly 32 is maintained while the housing 12 is operated on the base assembly 32.

Although illustrated as a cylindrically shaped device, it should be appreciated that the knob 10 of the invention may take any desired design or shape, such as a rectangular or oval shaped device. In addition, while described as a rotating device, it should be appreciated that the knob 10 of the invention may be operated by other suitable operational movement, such as lateral sliding.

The housing 12 includes an exterior sidewall 14 and an exterior top 16. The exterior sidewall 14 includes a recessed collar 18 opposite the exterior top 16. The exterior top 16 includes a window 20 into an interior 21 of the housing 12. The window 20 is illuminated by the light source 22 and may function as a position indicator for the illuminated knob 10. The window 20 may be an aperture, a clear translucent material, or a light conducting material such as a jewel or light pipe. It is understood that the window 20 and exterior top 16 may be configured in a number of ways. For example, the window 20 may take any suitable or desired design or shape, and further, may extend around the perimeter of the exterior top 16 or onto the exterior sidewall 14.

The recessed collar 18 includes a slot 30 for receiving the light source 22. The slot 30 is positioned on the recessed collar 18 directly below the window 20. In this way, the light source 22 is positioned directly below the window 20 within the interior 21 of the housing 12. The recessed collar 18 includes two apertures 42 for receiving the carrier assembly 25. The apertures 42 are positioned on either side of the slot 30 and allow for the carrier assembly 25 to attach to the recessed collar 18 of the housing 12 with the light source 22 positioned within the interior 21 of the housing 12 via the slot 30. The housing 12 includes arms 34 which attach to another device such as, for example, a rotating switch assembly (not shown) on the opposite side of the base assembly 32.

The carrier assembly includes a receiver bracket 24, a printed circuit board 26, and contact wipers 28. The printed circuit board 26 is received by the receiver bracket 24. The contact wipers 28 attach to the receiver bracket 24 and are connected to the printed circuit board 26. The light source 22 is received by the printed circuit board 26 such that leads 38 of the light source 22 are electrically connected to the printed circuit board 26. The printed circuit board 26, in turn, is electrically connected to the contact wipers 28. The contact wipers 28 are comprised of electrically conducting material. As discussed below, the contact wipers are electrically connected to one or more conductive traces 36 of the base assembly 32 which are electrically connected to a power source (not shown). The printed circuit board 26, contact wipers 28, and conductive traces 36 provide an electrical path from the power source to the light source 22.

The receiver bracket 24 includes arms 40 to attach to the apertures 42 in the recessed collar 18. By attaching to the recessed collar 18, the outer edge of the receiver bracket 24 is positioned flush with the outer edge of the exterior sidewall 14 and somewhat hidden from plain view. It is understood that the receiver bracket 24 may be attached to the housing 12 in a number of ways. For example, in an alternate embodiment, the receiver bracket 24 may attach to the interior 21 of the housing 12. In another alternate embodiment, the receiver bracket 24 may attach to a non-recessed portion of the exterior sidewall 14.

The light source 22 is a light emitting diode (LED), light bulb, or other suitable illumination device. The light source 22 is positioned within the interior 21 of the housing 12 directly beneath the window 20. It is understood that that the light source 22 may also be placed at other locations within the interior of the housing 12. Regardless of location of the light source 22, or manner in which the light is directed, however, the proximity of the light source 22 to the window 20 remains constant, and the illumination intensity remains uniform throughout the operation of the knob 10.

Illumination from the light source 22 may or may not be specifically directed to the window 20. As schematically shown in FIG. 3, the illuminated knob 10 is configured to include a light pipe 31 positioned within the knob 14 such that light from the light source 22 is specifically directed to the window 20. Alternatively, light may be directed from the light source 22 via another device, such as a light directing tube or a channel that is located within the interior 21 of the housing 12. Of course, the illuminated knob 10 shown in FIG. 1 does not include a light pipe 31.

The base assembly 32 includes conductive traces 36 comprised of an electrically conducting material, such as copper. The conductive traces 36 are electrically connected to a power supply (not shown). The conductive traces 36 are configured to maintain an electrical connection with the contact wipers 28 while the knob 10 is operated. As shown in FIG. 2, the conductive traces 36 may be configured, for example, in a circular fashion to facilitate the rotational operation of the knob 10. However, it should be appreciated that the conductive traces 36 may also be configured to allow for other desired operational movement of the knob 10, such as lateral sliding.

The base assembly 32 includes receiving apertures 44 for receiving the arms 34 of the housing assembly 12. The arms 34 attach to another device such as, for example, a rotating switch assembly (not shown) positioned on the side of the base assembly 32 opposite the housing 12. It is understood that the housing 12 may attach to the base assembly 32 in a number of ways. For example, in an alternate embodiment, the housing 12 may attach to the base assembly 32 by a rotating shaft extending from the base assembly and attached to the interior 21 of the housing 12.

In the embodiment shown, the knob 10 is operated by circular rotation of the housing 12 on the base assembly 32. The electrical connection between the contact wipers 28 and the conductive traces 36 is maintained throughout operation of the knob 10. Thus, electric power from the power source (not shown) is continuously provided to illuminate the light source 22 via the printed circuit board 26, contact wipers 28, and conductive traces 36 throughout the operation of the knob.

It is understood that the housing 12 may alternatively be operated by lateral sliding, or some other suitable operational motion. In such alternate embodiments, the conductive traces 36 and receiving apertures 44 of the base assembly 32 are configured to reflect the operational motion of the housing 12. For example, in an alternate embodiment, the housing 12 may laterally slide on the base assembly 32 in a linear motion. In another alternate embodiment, the base assembly 32 and conductive traces may be configured to allow for non-linear operational movement of the housing 12.

As the knob 10 is operated, the contact wipers 28 slide across the conductive traces 36. The contact wipers 28 are spring-like, and biased against the conductive traces 36. The contact wipers 28, which may be subject to vibration caused by friction with the conductive traces 36 or otherwise, provide electric power to the printed circuit board 26. The printed circuit board 26 provides electric power to the light source 22. As discussed above, light source leads 38 are not typically sturdy. A direct connection between contact wipers 28 and light source leads 38 would be subject to the vibration caused by friction as the contact wipers 28 slide over the conductive traces 36. The printed circuit board 26 functions as a stable interface buffer between the light source 22 and the contact wipers 28, resulting in a sturdy and reliable electrical connection.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An illuminated knob comprising:
    a housing with an interior;
    a carrier assembly attached to said housing;
    a light source positioned within said interior, and attached to said carrier assembly; and
    a base assembly that receives said housing;
    wherein during operation of said knob said carrier assembly is movable relative to the base assembly and maintains an electrical connection between said light source and said base assembly and wherein said light source illuminates said knob.

2. The illuminated knob of claim 1 wherein said carrier assembly comprises:
    a printed circuit board configured to receive said light source;
    a receiver bracket configured to receive said printed circuit board; and
    at least one contact wiper connected to said printed circuit board;
    wherein said at least one contact wiper maintains contact with said base assembly throughout operation of said knob.

3. The illuminated knob of claim 2 wherein said base assembly comprises at least one conductive trace configured to maintain contact with said at least one contact wiper throughout operation of said knob.

4. The illuminated knob of claim 3 wherein said base assembly further comprises at least one aperture for receiving at least one arm of said housing.

5. The illuminated knob of claim 4 wherein said housing comprises an exterior sidewall with a slot for receiving said light source.

6. The illuminated knob of claim 5 wherein said exterior sidewall comprises a recessed collar with an aperture for receiving an arm of said carrier assembly such that an outer edge of said carrier assembly is substantially flush with an outer edge of said exterior sidewall.

7. The illuminated knob of claim 6 wherein said housing further comprises a window and wherein said light source is positioned directly beneath said window.

8. The illuminated knob of claim 7 wherein said interior further comprises one of a light transmitting pipe, a light directing tube, or a light directing channel, that directs light from said light source to said window.

9. The illuminated knob of claim 4 wherein said carrier assembly attaches to said interior.

10. The illuminated knob of claim 1 wherein said light source comprises one of a light emitting diode or a light bulb.

11. The illuminated knob of claim 1 wherein said housing further comprises a window and said window comprises one of an aperture, a translucent material, a jewel, or a light pipe.

12. An illuminated knob comprising:
a housing with an interior;
a base assembly that receives said housing;
a light source; and
means for positioning said light source within said interior being movable relative to said base assembly during operation of said knob, to maintain an electrical connection between said light source and said base assembly;
wherein said light source illuminates said knob.

13. The illuminated knob of claim 12 wherein said means for positioning said light source within said interior is configured to attach to an exterior sidewall of said housing.

14. The illuminated knob of claim 13 wherein said an outer edge of said means for positioning said light source within said interior is substantially flush with an outer edge of said exterior sidewall.

15. A carrier assembly for an illuminated knob of the type comprising a moveable housing and a base, said carrier assembly comprising:
a printed circuit board for receiving a light source;
a bracket that receives said printed circuit board and positions said light source within an interior of the housing; and
at least one electrical contact disposed adjacent to the base, said contact maintaining an electrical connection between said printed circuit board and the base as the housing moves during operation of the knob.

16. The carrier assembly for an illuminated knob of claim 15 wherein said receiver bracket further comprises at least one arm for attaching said receiver bracket to at least one aperture of said housing.

17. The carrier assembly for an illuminated knob of claim 16 wherein an outer edge of said receiver bracket is substantially flush with an outer edge of said housing.

18. A carrier assembly for an illuminated knob of the type comprising a housing and a base, said carrier assembly comprising:
a light source;
a printed circuit board operable to retain said light source;
a bracket operable to retain said printed circuit board, said bracket configured to be received in the housing of the knob such that an outer edge of said bracket is substantially flush with an outer edge of the housing; and
at least one contact operable to maintain an electrical connection between said printed circuit board and the base during operation of the knob.

19. The carrier assembly for an illuminated knob of claim 18, wherein said receiver bracket further comprises at least one arm for attaching said receiver bracket to at least one aperture of said housing.

* * * * *